(12) United States Patent
Kim et al.

(10) Patent No.: US 9,965,077 B2
(45) Date of Patent: May 8, 2018

(54) CAPACITIVE FORCE SENSOR AND METHOD FOR PREPARING THE SAME

(71) Applicants: KOREA INSTITUTE OF SCIENCE AND TECHNOLOGY, Seoul (KR); KOREA RESEARCH INSTITUTE OF STANDARDS AND SCIENCE, Daejeon (KR)

(72) Inventors: Heesuk Kim, Seoul (KR); Jong Ho Kim, Daejeon (KR); Sang-Soo Lee, Seoul (KR); Yon Kyu Park, Daejeon (KR); Min-Seok Kim, Daejeon (KR)

(73) Assignees: KOREA INSTITUTE OF SCIENCE AND TECHNOLOGY, Seoul (KR); KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days. days.

(21) Appl. No.: 15/216,821

(22) Filed: Jul. 22, 2016

(65) Prior Publication Data

US 2017/0075467 A1    Mar. 16, 2017

(30) Foreign Application Priority Data

Sep. 11, 2015  (KR) ........................ 10-2015-0128893

(51) Int. Cl.
*G06F 3/045* (2006.01)
*G06F 3/041* (2006.01)
(Continued)

(52) U.S. Cl.
CPC ............ *G06F 3/0414* (2013.01); *G01L 1/146* (2013.01); *G01L 1/148* (2013.01); *G06F 3/044* (2013.01); *G06F 2203/04103* (2013.01)

(58) Field of Classification Search
CPC .................. G06F 3/0414; G06F 3/044; G06F 2203/04103; G01L 1/148; G01L 1/146
See application file for complete search history.

(56) References Cited

U.S. PATENT DOCUMENTS 4,495,434 A * 1/1985 Diepers ................... G01L 1/146 310/338
2003/0121767 A1* 7/2003 Caldwell ................ A47B 57/00 200/512

(Continued)

FOREIGN PATENT DOCUMENTS

JP    2005-177003 A    7/2005
JP    2008-239929 A    10/2008
(Continued)

*Primary Examiner* — Erin M File
(74) *Attorney, Agent, or Firm* — Goldilocks Zone IP Law

(57) ABSTRACT

The present disclosure relates to a force sensor including a first substrate, a first electrode installed in a pattern on an upper surface of the first substrate, a second substrate disposed above and spaced apart from the first substrate, a second electrode installed in a pattern on a lower surface of the second substrate, facing the first electrode, and a dielectric interposed between the first substrate and the second substrate, wherein the dielectric includes a first dielectric surrounding an outside of the second electrode, and a pressure rib connecting the first dielectric to the first electrode, and a method for preparing the same, and shows a remarkably superior effect to related art, in terms of capacitance, interactivity and durability.

12 Claims, 12 Drawing Sheets

(51) Int. Cl.
*G06F 3/044* (2006.01)
*G01L 1/14* (2006.01)

(56) References Cited

U.S. PATENT DOCUMENTS

| | | | |
|---|---|---|---|
| 2010/0053087 A1* | 3/2010 | Dai | G06F 3/016 |
| | | | 345/168 |
| 2013/0021544 A1* | 1/2013 | Fukuyama | G02F 1/13338 |
| | | | 349/12 |
| 2014/0174204 A1* | 6/2014 | Chen | G01L 1/142 |
| | | | 73/862.626 |
| 2016/0274724 A1* | 9/2016 | Chang | G06F 3/044 |

FOREIGN PATENT DOCUMENTS

| | | |
|---|---|---|
| KR | 10-2011-0056028 A | 5/2011 |
| KR | 10-2014-0096644 A | 8/2014 |
| WO | 98/04045 A1 | 1/1998 |

\* cited by examiner

CAPACITIVE FORCE SENSOR AND METHOD FOR PREPARING THE SAME

CROSS-REFERENCE TO RELATED APPLICATIONS

This application claims priority under 35 U.S.C. § 119 to Korean Patent Application No. 10-2015-0128893 filed on Sep. 11, 2015 in the Korean Intellectual Property Office, the disclosure of which is incorporated herein by reference in its entirety.

TECHNICAL FIELD

The present disclosure relates to a force sensor with outstanding capacitance, interactivity and durability and a method for preparing the same.

BACKGROUND ART

Generally, polymers are superior to other materials in processability, mechanical strength, electrical insulation, optical transparency and mass production, and are being used as an important new material in the field of high-tech industry such as semiconductor, electrical and electronic industry, aerospace, defense industry, display and alternative energy. As a dielectric material, polymer materials have advantages because they can obtain various properties by molecular design and are very well suited for molding, while they have poor dielectric properties and lower thermal or mechanical properties than inorganic materials, significantly limiting the applications as a new material.

Currently, attempts are being made to study the dielectric properties of polymers for the purpose of use as high-k gate dielectrics for flexible electronic materials, dielectric elastomer actuators (DEAs) and touch sensors.

Particularly, touch panel technology can be used in a variety of electronic/communication devices such as laptop computers, personal digital assistant (PDA), game consoles, smart phones and navigation, and can be used to select or input functions desired by users. Such touch panel technology is largely implemented by resistive approach and capacitive approach. Capacitive touch sensors not only allow for multi-touch but also can sense contact position and contact force. Dielectric materials necessary for these touch sensors need not only high permittivity of 10 or more but also a low modulus of elasticity and a high adhesive strength with electrode to increase the capacitance. First of all, to fabricate reliable sensors, it is necessary to ensure high reliability of dielectric materials.

Polymer materials having a high dielectric constant are an ideal material for a wide range of electronic material applications because they are free from problems caused by dispersion in multiphase systems when they form a single phase. Recently, Pennsylvania State University research team reported a method for preparing PVDF electroactive copolymers having a dielectric constant of 100 by a method which treats a PVDF copolymer film by radiation, following by poling with an electric field, Shizuoka University in Japan developed materials having a dielectric constant of 20 or more using polymer having a polar cyano group, German Plastic Institute and University of Wales in U.K. prepared polymer dielectrics having a dielectric constant of 8 or more using PVDF and its related copolymers. However, these materials have a limitation on the applications of capacitive touch sensors due to a high price, a low yield and a high modulus of elasticity.

To solve the problem, studies have been made to form a composite of high-k filler and elastomer to increase the dielectric constant of the elastomer. Japanese Patent Publication No. 2008-239929 and Japanese Patent Publication No. 2005-177003 added a ceramic filler including lithium to thermoplastic elastomer to increase the dielectric constant at a low cost, WO98/04045 discloses electroactive polymer using a composite in which a conductive filler such as carbon black, graphite and metal particles is added to elastomer, and besides, research is being conducted by many groups to ensure a high dielectric constant of elastomer by dispersing a conductive filler having a large aspect ratio of one dimension such as carbon nanotubes in elastomer.

However, these insulator/conductor composites are only focused on improved dielectric properties, and they were found unsuitable for high dielectric properties, an adhesive strength with electrode, a low modulus of elasticity and a high reaction speed required for force sensors.

RELATED LITERATURES

Patent Literatures

Japanese Patent Publication No. 2008-239929
Japanese Patent Publication No. 2005-177003

DISCLOSURE

Technical Problem

The problem to be solved by the present disclosure is to provide a force sensor with outstanding capacitance, interactivity and durability and a method for preparing the same.

Technical Solution

According to a typical aspect of the present disclosure, there is provided a force sensor including a first substrate, a first electrode installed in a pattern on an upper surface of the first substrate, a second substrate disposed above and spaced apart from the first substrate, a second electrode installed in a pattern on a lower surface of the second substrate, facing the first electrode, and a dielectric interposed between the first substrate and the second substrate, wherein the dielectric includes a first dielectric surrounding an outside of the second electrode, and a pressure rib connecting the first dielectric to the first electrode.

According to another typical aspect of the present disclosure, there is provided a method for preparing a force sensor including a) stacking a first electrode on a first substrate, b) stacking a second electrode on a second substrate, c) forming a first dielectric and a pressure rib on the second electrode to prepare an upper body of the force sensor, d) forming a second dielectric on an upper surface of the first electrode to prepare a lower body of the force sensor, and e) bonding the upper body of the force sensor and the lower body of the force sensor.

Advantageous Effects

The force sensor according to the present disclosure or force sensors prepared by the preparing method show a remarkably superior effect to related art, in terms of capacitance, interactivity and durability.

BEST MODE

Figure 1:
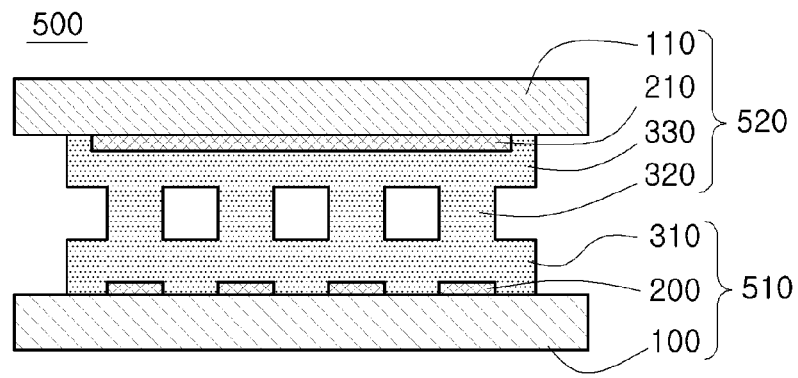
FIG. 1 is a cross-sectional view showing a force sensor according to an embodiment of the present disclosure.

Hereinafter, many aspects and various embodiments of the present disclosure will be described in further detail.

According to an aspect of the present disclosure, disclosed is a force sensor including a first substrate 100, a first electrode 200 installed in a pattern on the upper surface of the first substrate 100, a second substrate 110 disposed above and spaced apart from the first substrate 100, a second electrode 210 installed in a pattern on the lower surface of the second substrate 110, facing the first electrode 200, and a dielectric 300 interposed between the first substrate and the second substrate, wherein the dielectric 300 includes a first dielectric 330 surrounding the outside of the second electrode 210, and pressure rib 320, 321, 322 connecting the first dielectric 330 to the first electrode 200.

Figure 2:
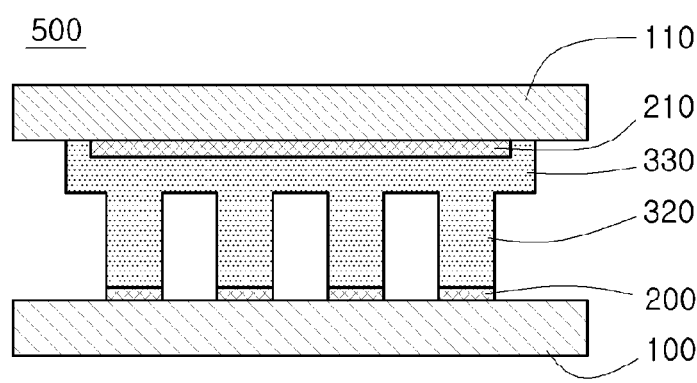
FIG. 2 is a cross-sectional view showing a force sensor according to another embodiment of the present disclosure.
Figure 3:
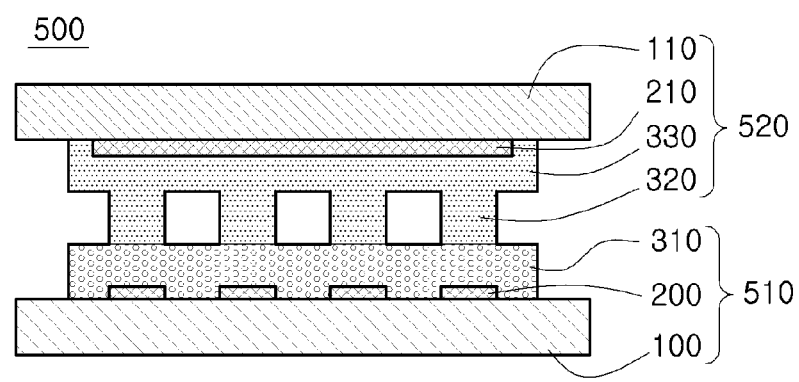
FIG. 3 is a cross-sectional view showing a force sensor according to another embodiment of the present disclosure.
Figure 4:
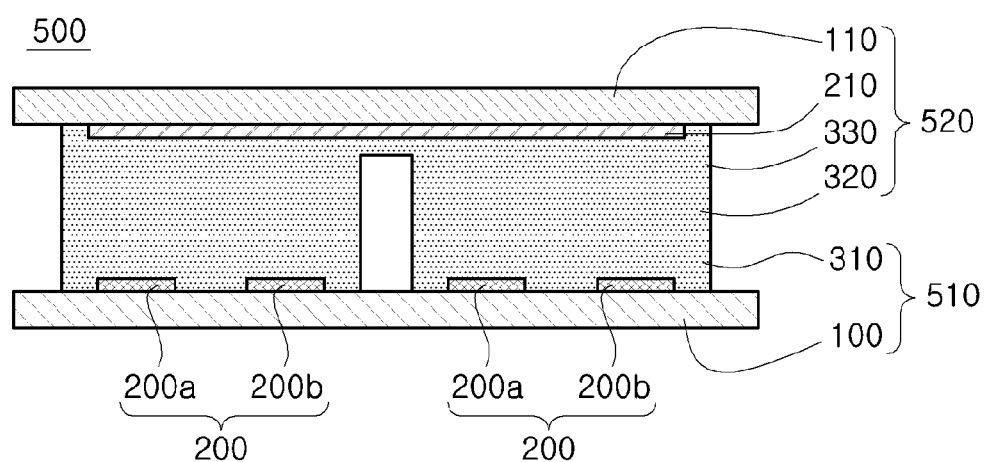
FIG. 4 is a cross-sectional view showing a force sensor according to another embodiment of the present disclosure.
Figure 5:
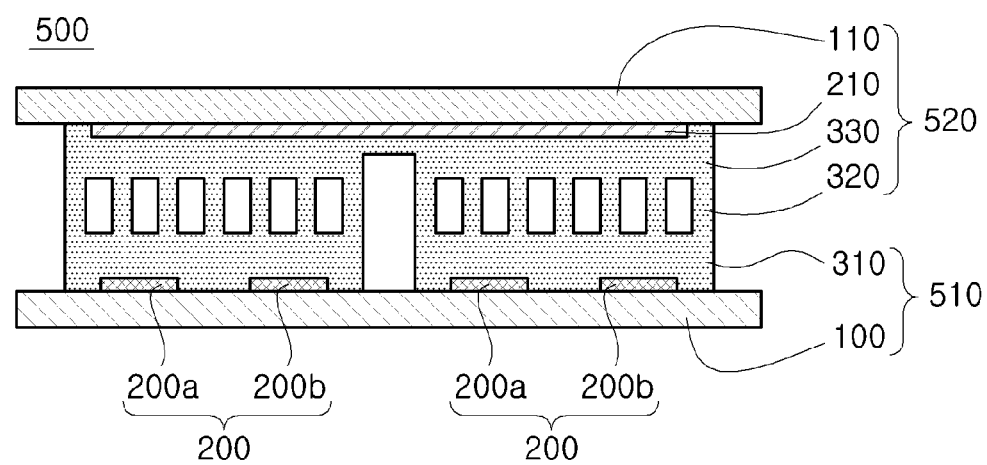
FIG. 5 is a cross-sectional view showing a force sensor according to another embodiment of the present disclosure.
Figure 6:
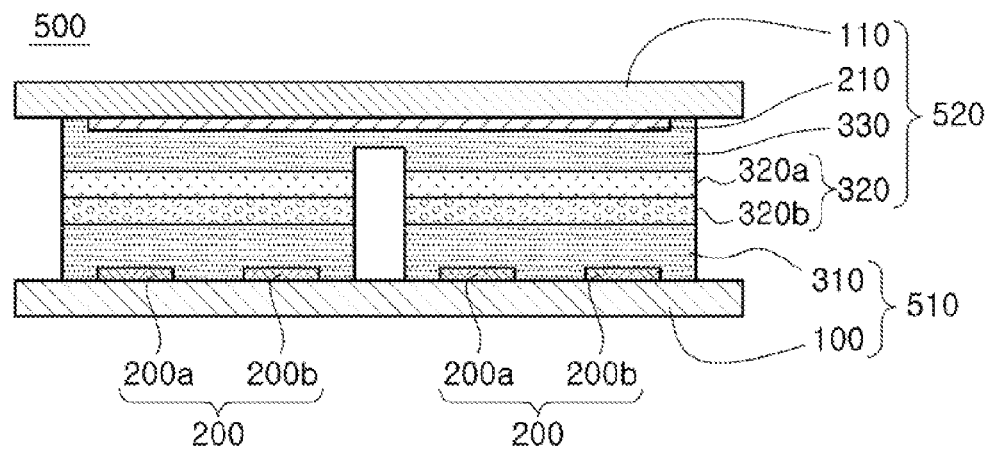
FIG. 6 is a cross-sectional view showing a force sensor according to another embodiment of the present disclosure.

According to an embodiment, as shown in FIGS. 1 through 3, the first electrode 200 may be an output electrode, and the second electrode 210 may be an input electrode. In this instance, each of the plurality of first electrodes 200 and the second electrode 210 form a sensor. Also, according to another embodiment, as shown in FIGS. 4 through 6, the first electrode 200 is formed to include an input electrode 200a and an output electrode 200b adjacent to each other on the upper surface of the first substrate 100, and the second electrode 210 may be a ground electrode. In this instance, a pair of the input electrode 200a and the output electrode 200b arranged adjacent to each other form a sensor.

Also, as shown in FIGS. 1 and 3 through 6, preferably, the dielectric 300 further includes a second dielectric 310 interposed between the pressure rib 320 and the first electrode 200.

The first electrode 200 is preferably formed at a location where a force applied from the pressure rib 320 of the dielectric 300 to the second dielectric 310 is transferred in the vertical direction. In relation to this, seeing FIGS. 1 through 6, the first electrode 200 is installed in various patterns on the upper surface of the first substrate 100 according to necessity, and more preferably, the first electrode 200 is formed at a location at which a force applied from the pressure rib 320 of the dielectric 300 is transferred in the vertical direction, but is not limited thereto.

Also, as shown in FIGS. 1 through 3 and 5, the pressure rib 320 connects the first dielectric 330 to the first electrode 200, may be provided in multiple numbers between the first dielectric 330 and the first electrode 200, and acts to transfer a force applied from the second substrate 110 onto the first electrode 200. Also, as shown in FIGS. 4 and 6, the pressure rib 320 connects the first dielectric 330 to the first electrode 200, and may be provided singly between the first dielectric 330 and the first electrode 200. Also, as shown in FIG. 6, the pressure rib 320 is formed with a multilayer structure, and may be formed such that the rigidity of a pressure rib 320a adjacent to the second electrode 210 is larger than the rigidity of a pressure rib 320b adjacent to the first electrode 200.

Also, the pressure rib 320 is preferably configured to form a larger cross sectional area than the first electrode 200, which is for precise transfer of a force applied from the second substrate 110 to the first electrode 200, and the pressure rib 320 is not limited to a particular dimension. As a particular example, the pressure rib 320 may be formed in a cylindrical or square shape having a diameter of from 0.01 to 1 mm and a height of from 0.01 to 1 mm, but is not limited thereto, and may be formed in various shapes or appearances according to the pattern of the first electrode 200.

Also, the cross sectional area of the first dielectric 330 and the second dielectric 310 is preferably 1.1 to 10 times wider than the cross sectional area of the first electrode 200 or the second electrode 210.

Particularly, the second dielectric 310 of the dielectric 300 is preferably formed to surround the outside of the first electrode 200, which hinders an initial gap occurring between two electrodes that is problematic in related art.

That is, conventionally, a dielectric effect reduces due to an initial gap between two electrodes (air gap), and electrodes change in location by repeated load application, and as a result, changes in the initial state and the distance between electrodes cause an interactivity reduction problem of the sensor. Therefore, to solve the problem, the present disclosure combined an electrode with a dielectric such that the dielectric surrounds the outside of the electrode to prevent a gap from occurring between two electrodes, and this technical feature can be achieved by using a polymer dielectric composition having flexibility and a high dielectric constant and a high modulus of elasticity.

Preferably, the rigidity of the first dielectric 330 and the second dielectric 310 is 1.1 to 10 times higher than the rigidity of the pressure rib 320, and the cross sectional area of the first dielectric 330 and the second dielectric 310 is 1.1 to 10 times wider than the cross sectional area of the pressure rib 320, and this formation plays an important role in durability of the force sensor.

That is, the dielectric 300 may be configured such that the first dielectric 330 and the second dielectric 310 are formed of the same dielectric composition as the pressure rib 320, or the first dielectric 330 and the second dielectric 310 are formed of a different material from the pressure rib 320 according to the use and purpose. In other words, in addition to a polymer dielectric composition described later, the dielectric 300 may selectively include and use at least one selected from silicone-based, polystyrene-based, polyamide-based, polyurethane-based, polyepoxy-based, polyacryl-based, polyester-based and polyolefin-based polymer resins.

Generally, the capacitance (C) of the sensor can be calculated through the following equation (1), and due to having an improved dielectric constant and a high modulus of elasticity, the polymer dielectric composition significantly reduces the distance between electrodes when a force is applied to the sensor, showing an outstanding effect on improving the capacitance of the sensor.

$$C = \varepsilon \cdot \frac{A}{d} \qquad (1)$$

(where $\varepsilon$=the dielectric constant of dielectric, A=the area of electrode, d=the distance between electrodes)

According to another embodiment, the dielectric 300 is a polymer dielectric composition including polymeric elastomer. The polymeric elastomer is preferably at least one selected from silicone-based resin, urethane-based resin, isoprene-based resin, fluoro-based resin, styrene-butadiene rubber, chloroprene rubber, acrylonitrile copolymer and acrylate rubber, and more preferably, silicone-based resin such as polydimethylsiloxane resin, or polydimethylsiloxane-based gel type resin. The polymeric elastomer is a polymer compound having elasticity, namely, a property that is able to return to its original length, and effectively contributes the improvement of the modulus of elasticity in the polymer dielectric.

The polymer dielectric composition may further include a conductive filler, a ceramic filler, an organic metal compound or their mixtures in the polymeric elastomer.

The conductive filler is preferably at least one selected from metal particles, single-walled carbon nanotubes, multi-walled carbon nanotubes, graphene, graphite, carbon black, carbon fibers and fullerene, and more preferably, carbon black or carbon nanotubes. The conductive filler confers a dielectric constant to the polymer dielectric, allowing the use in a wide range of electronic material applications, such as actuators, force sensors, and touch panels.

The ceramic filler is metal oxide, silicate, boride, carbide, nitride, perovskite, or their mixtures, and the organic metal compound is preferably a compound in which at least one type of metal selected from copper, zinc and nickel is bonded to at least one type of organic matter selected from phthalocyanine, uranine and rhodamine.

More preferably, the silicate is at least one selected from $Na_2SiO_3$, $Li_4SiO_4$, $BaTiSi_3O_9$, $ZrSiO_4$, $CaMgSi_2O_6$ and $Zn_2SiO_4$, and the metal oxide is at least one selected from zirconium oxide, tantalum oxide, tin oxide, niobium oxide, titanium oxide, rare earth oxide, antimony oxide, vanadium oxide, iron oxide, strontium oxide, copper oxide, titanium oxide, zinc oxide, niobium oxide, tantalum oxide and yttrium oxide, and much more preferably, at least one selected from $CaTiO_3$, $MgZrSrTiO_6$, $MgTiO_3$, $MgAl_2O_4$, $BaZrO_3$, $BaTiO_3$, $BaSnO_3$, $BaNb_2O_6$, $BaTa_2O_6$, $BaSrTiO_3$, $WO_3$, $MnO_2$, $SrZrO_3$, $TiO_2$, $ZnO$, $SnTiO_4$, $ZrTiO_4$, $CaZrO_3$, $CaSnO_3$, $CaWO_4$, $MgTa_2O_6$, $MrZrO_3$, $La_2O_3$, $CaZrO_3$, $MgSnO_3$, $MgNb_2O_6$, $SrNb_2O_6$, $MgTa_2O_6$ and $Ta_2O_3$.

The conductive filler, ceramic filler, organic metal compound or their mixtures is preferably present in 0.001 to 5 parts by weight, and more preferably, 0.1 to 5 parts by weight, based on 100 parts by weight of the polymeric elastomer. In the case of less than 0.001 parts by weight, it is undesirable because the dielectric effect reduces, and in the case of more than 5 parts by weight, it is undesirable because the dielectric constant does not increase any longer, and an electric current is produced or a problem with curing of the polymer occurs.

Particularly, the conductive filler, the ceramic filler, or the organic metal compound may further include a dispersant of the following formula 1, and the dispersant is chemically or mechanically bonded to the surface of the filler to improve the dispersibility and dielectric properties of the filler or the organic metal compound.

$CX_3(CX_2)n\text{-}Y$ [Formula 1]

(where X is H or F,

Y is H, SH, $NH_2$, OH, COOH, or $SiR_1R_2R_3$, n is an integer of from 1 to 30, and the $R_1$, $R_2$ and $R_3$ are the same or different, and are H, F, Cl, Br, an alkyl group with 1 to 10 carbon atoms, an alkoxy group with 1 to 10 carbon atoms, an alkenyl group with 1 to 10 carbon atoms, an alkyne group with 1 to 10 carbon atoms, an aryl group with 1 to 30 carbon atoms, a cyclo alkyl group with 1 to 30 carbon atoms, or a cyclo alkenyl group with 1 to 30 carbon atoms.)

Specifically, the dispersant includes any material having an alkyl chain, but is preferably at least one selected from octadecyltrimethoxysilane, dodecyl trimethoxysilane, octadecylamine, dodecylamine, octadecane, and dodecane.

As described above, the dispersant having a relatively long alkyl chain with 8 to 12 carbon atoms is chemically or mechanically bonded to the surface of the conductive filler to improve the dispersibility of the conductive filler and prevent the dielectric properties from degrading due to the interaction of the conductive fillers, showing an outstanding effect on improving the dielectric properties of the polymer dielectric composition.

According to another embodiment, the filler or the organic metal compound and the dispersant are preferably mixed at a weight ratio of from 1:0.001 to 20. More preferably, the weight ratio is from 1:0.01 to 10, and when the weight ratio is from 0.01 to 10, the dispersibility improving effect is further improved, and curing of the polymer composition or adhesion with the electrode is enhanced. In contrast, when the weight ratio is less than 0.001, it is undesirable because the dispersibility improving effect significantly reduces, and when the weight ratio exceeds 20 parts by weight, it is undesirable because curing of the polymer composition or adhesion with the electrode significantly reduces.

The filler is preferably treated with at least one type of acid selected from sulfuric acid, nitric acid, hydrochloric acid and phosphoric acid, but is not limited thereto. The acid treatment of the filler is a method for carbon nanotube purification and can remove a metallic catalyst through simple treatment in an acidic solution, and the acid treatment process has an incidental effect, such as degradation and cutting of carbon nanotubes and introduction of functional groups.

According to another embodiment, the first substrate 100 and the second substrate 110 are preferably a polyimide film, a polyethylene terephthalate film, or at least one selected from silicone-based, polystyrene-based, polyamide-based, polyurethane-based, polyepoxy-based, polyacryl-based, polyester-based and polyolefin-based polymeric elastomers, or their mixtures, but are not limited thereto, and any polymer having elasticity is available.

Also, the first electrode 200 and the second electrode 210 are preferably at least one selected from gold, silver, copper, conductive polymer, a stretchable electrode, and a composite material in which polymer is mixed with a conductive filler, but are not limited thereto.

Specifically, the conductive polymer includes any polymer exhibiting a conductive property, but is preferably poly(3,4-ethylenedioxythiophene) polystyrene sulfonate, the stretchable electrode includes graphene and a metal nanowire, and the metal nanowire includes gold, silver or copper. Also, the composite material in which polymer is mixed with a conductive filler is a composite in which a filler exhibiting a conductive property is contained in elastomer, and the conductive filler is preferably particles of metal such as gold, silver and copper, carbon materials such as carbon black, carbon nanotubes, graphene and graphite, or their mixtures, but is not limited thereto.

According to another aspect of the present disclosure, there is provided a method for preparing a force sensor including a) stacking the first electrode 200 on the first substrate 100; b) stacking the second electrode 210 on the second substrate 110; c) forming the first dielectric 330 and the pressure rib 320, 321, 322 on the second electrode 210 to prepare an upper body 520 of the force sensor; d) forming the second dielectric 310 on the upper surface of the first electrode 200 to prepare a lower body 510 of the force sensor; and e) bonding the upper body 520 of the force sensor and the lower body 510 of the force sensor.

The step a) is a step for stacking the first electrode 200 on the first substrate 100, in which a polymer dielectric composition having flexibility is coated on the first electrode 200 as described previously to prevent a gap from occurring between the first electrode 100 and the dielectric 300, which effectively contributes to the improved interactivity of the sensor.

According to another embodiment, the step b) is a step for stacking the second electrode 210 on the second substrate 110, in which the pattern of the second electrode 210 may be formed differently according to the use and purpose of the sensor.

The first substrate 100 and the second substrate 110 are preferably a polyimide film, a polyethylene terephthalate film, or at least one selected from silicone-based, polystyrene-based, polyamide-based, polyurethane-based, polyepoxy-based, polyacryl-based, polyester-based and polyolefin-based polymeric elastomers or their mixtures, but are not limited thereto, and any polymer having elasticity is available. Also, the first electrode 200 and the second electrode 210 are preferably at least one selected from gold, silver, copper, conductive polymer, a stretchable electrode, and a composite material in which polymer is mixed with a conductive filler, but are not limited thereto. Particular types of the first substrate 100 and the second substrate 110, and the first electrode 200 and the second electrode 210 are the same as the foregoing, and its description is omitted herein.

Figure 7:
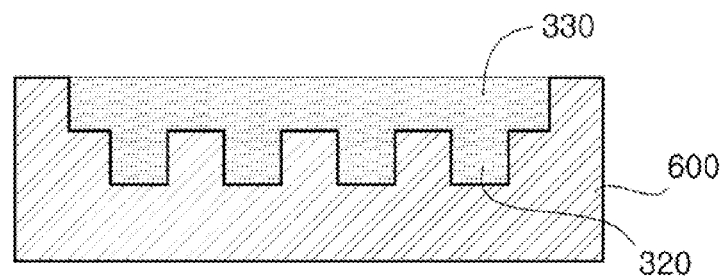
FIG. 7 is a cross-sectional view showing an integral mold used to prepare a first dielectric and a pressure rib according to an embodiment of the present disclosure.

According to another embodiment, the step c) is a step for coating a polymer dielectric composition using an integral mold 600 of FIG. 7 or a composite mold 610, 611, 612 made up of multiple separate parts as shown in FIGS. 8A through 10 to form the first dielectric 330 and the pressure rib 320, 321, 322 of the dielectric 300 on the second electrode 210 thereby to prepare the upper body 520 of the force sensor, and it is preferable to apply a vacuum to remove air bubbles inside after coating the polymer dielectric composition on the mold.

Figure 8A:
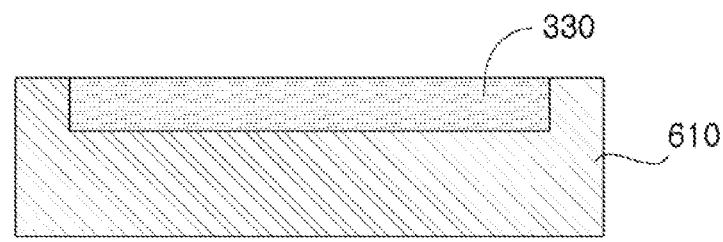
FIGS. 8A and 8B are partially cross-sectional views showing a composite mold used to prepare a first dielectric and a pressure rib according to another embodiment of the present disclosure.
Figure 8B:
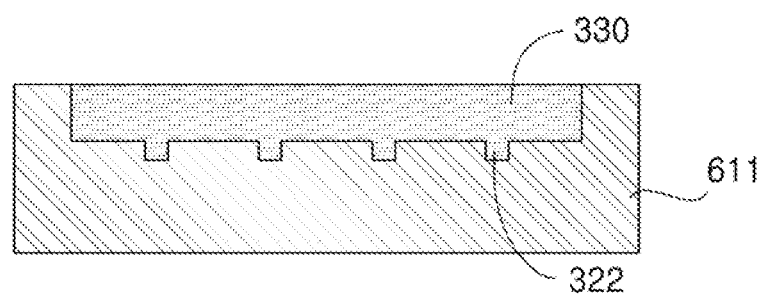
Figure 9:
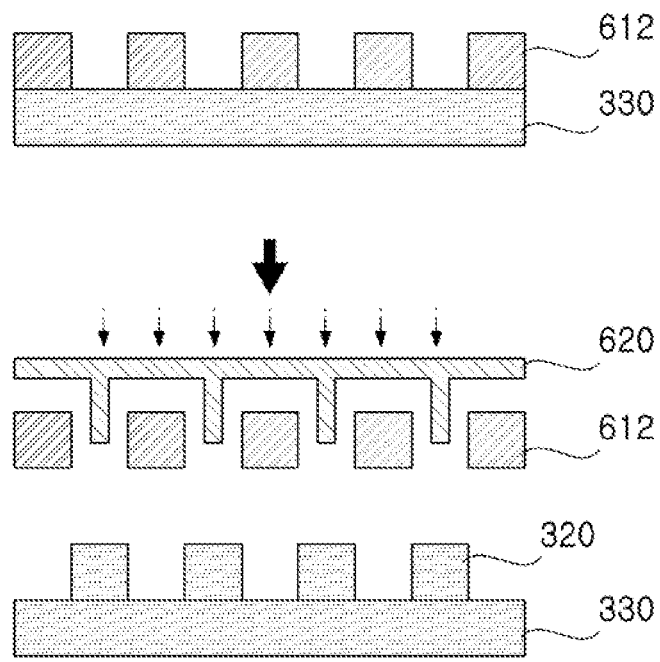
FIG. 9 is a partially cross-sectional view showing a composite mold used to prepare a first dielectric and a pressure rib according to another embodiment of the present disclosure and a diagram illustrating a process of separating the mold and a molded product.
Figure 10:
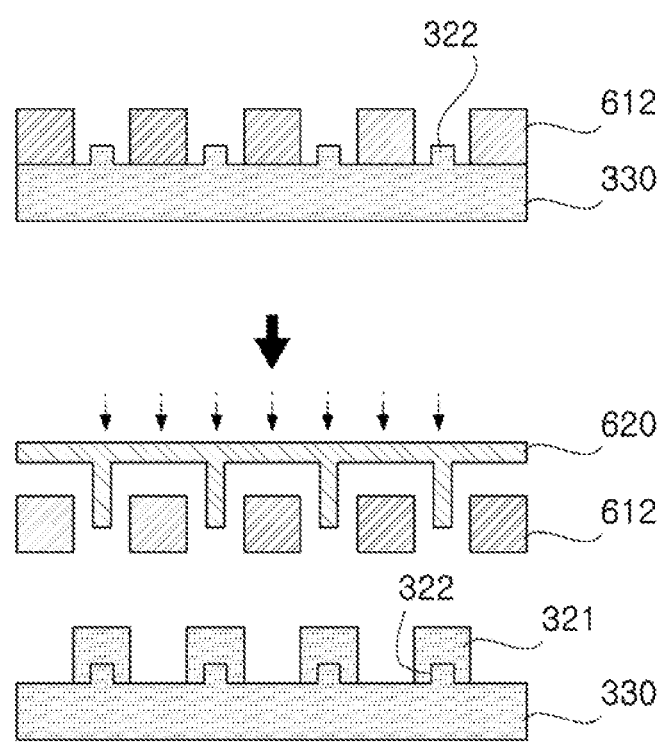
FIG. 10 is a partially cross-sectional view showing a composite mold used to prepare a first dielectric and a pressure rib according to another embodiment of the present disclosure and a diagram illustrating a process of separating the mold and a molded product.

Specifically, the step c) may use the integral mold 600 as shown in FIG. 7 to form the first dielectric 330 and the pressure rib 320, 321, 322 at the same time, and may use the composite mold 610, 611, 612 made up of multiple separate parts as shown in FIGS. 8A through 10. The molding using the composite mold 610, 611, 612 first prepares the first dielectric 330 and the pressure rib 322 using the first mold 610, 611 as shown in FIG. 8A or 8B, and loads the second mold 612 on the first dielectric 330, and re-coats the polymer dielectric composition thereon to prepare the pressure rib 320, 321 as shown in FIGS. 9 and 10.

In this instance, an adhesive tape may be used to fix the first dielectric 330 and the second mold 612, which prevents the composition from infiltrating into a cavity of the second mold 612 to form an unnecessary molded element.

The pressure rib 320, 321 is preferably prepared by coating thicker by 5 to 100 μm than the surface of the second mold 612 for preparing the pressure rib 320, 321 to ensure uniformity of the surface, and after the molding finishes, a thickly coated part may be removed to form a smooth surface.

Also, the pressure rib may be formed as the first pressure rib 321, the second pressure rib 322, or the plurality of pressure ribs 321 and 322, and the pressure rib may be formed by a molding process as shown in FIG. 10, but is not limited thereto.

In using the composite mold 610, 611, 612, a detaching jig 620 may be used to separate the mold and a molded product, and even better, provides an advantage because it is easy to detach the molded product.

That is, as opposed to related art, because the present disclosure can form the dielectric 300 using a mold, the present disclosure can prepare the dielectric 300 with a desired shape, allowing for precise shaping and increased durability. In addition, advantages are that it is easy to fabricate and possible to realize mass production of dielectric with uniform quality.

A detailed description of the composition forming the dielectric 300, namely, the polymer dielectric composition is the same as the foregoing, and is omitted herein.

According to another embodiment, the step d) is a step for forming the second dielectric 310 on the upper surface of the first electrode 200 to prepare the lower body 510 of the force sensor, and it is preferable to form in the same manner as the first dielectric 330.

Figure 15:
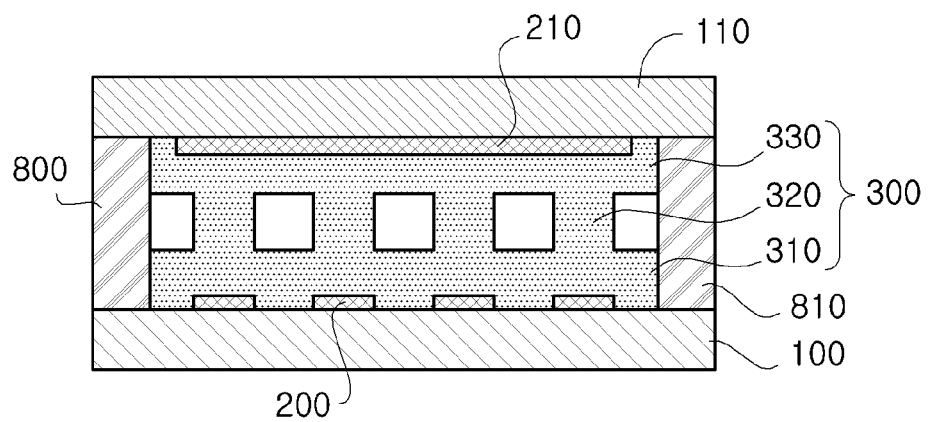
FIG. 15 is a cross-sectional view showing a force sensor with an upper body of the force sensor and a lower body of the force sensor assembled according to another embodiment of the present disclosure.
Figure 16:
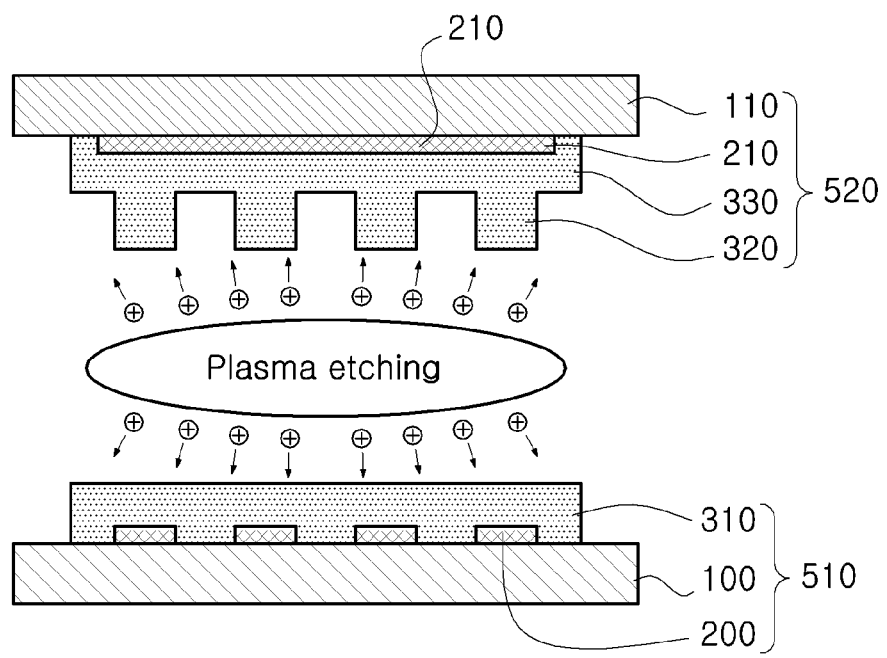
FIG. 16 is a cross-sectional view illustrating a process of preparing a force sensor according to another embodiment of the present disclosure.

According to another embodiment, the step e) is a step for bonding the upper body 520 of the force sensor and the lower body 510 of the force sensor, and specifically, as shown in FIG. 15, a first method bonds the first substrate 100 and the second substrate 110 with a thermal adhesive tape or a double-sided tape 800, 810 on both edges thereof, and assembles them at room temperature by the application of a load of from 0.1 to 10 kg, or as shown in FIG. 16, a second method performs plasma etching on the lower surface of the upper body 520 of the force sensor and the upper surface of the lower body 510 of the force sensor to assemble them.

Figure 13:
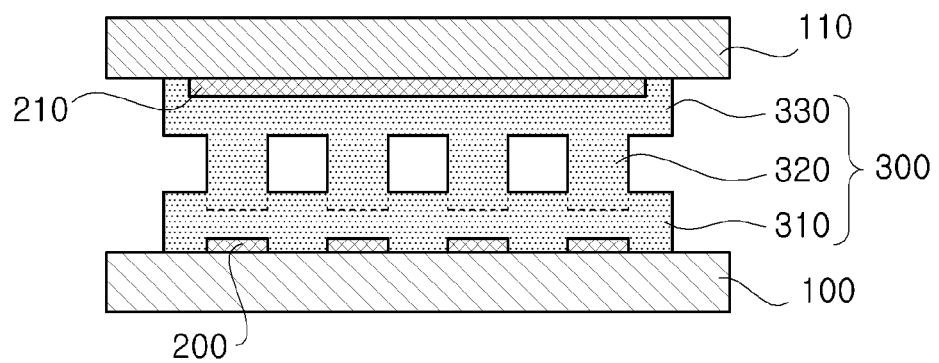
FIG. 13 is a cross-sectional view showing a force sensor with an upper body of the force sensor and a lower body of the force sensor assembled according to an embodiment of the present disclosure.

As shown in FIG. 13, a third method disposes the lower body 510 of the force sensor and the upper body 520 of the force sensor such that a part of the end of the pressure rib 320 of the upper body 520 of the force sensor is embedded in the second dielectric 310, assembles them, applies a load of from 0.1 to 10 kg, and cures them in a thermal oven at the temperature of from 80 to 150° C. for 50 to 120 minutes, or a fourth method forms a pressure rib for adhesion having the cross sectional area 1.1 to 10 times wider than the cross sectional area of the pressure rib 320 of the upper body 520 of the force sensor on the upper surface of the lower body 510 of the force sensor, and assembles the upper body 520 of the force sensor with the lower body 510 of the force sensor.

Figure 17:
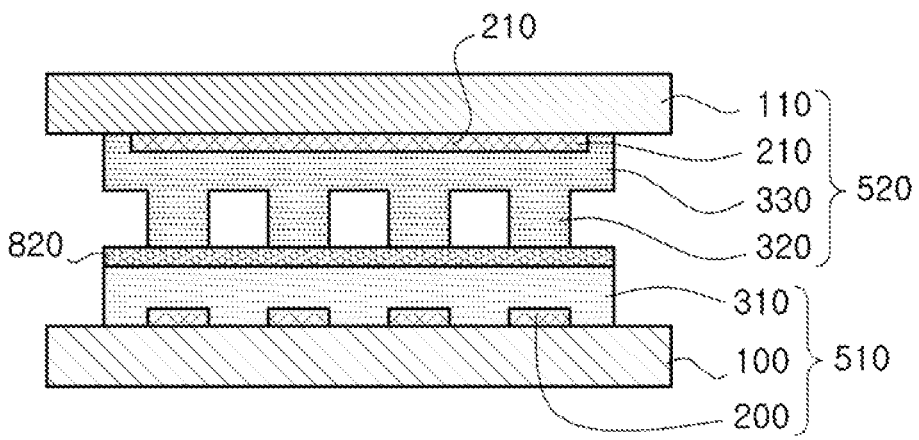
FIG. 17 is a cross-sectional view showing a force sensor with an upper body of the force sensor and a lower body of the force sensor assembled according to another embodiment of the present disclosure.
Figure 18:
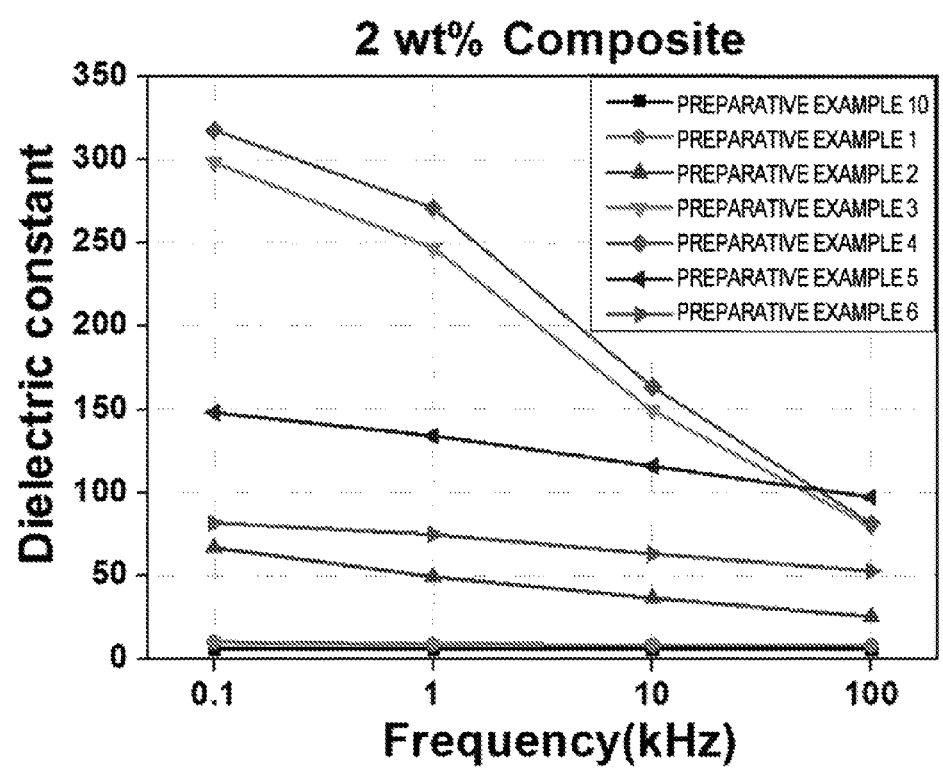
FIG. 18 is a graph showing dielectric constant vs frequency in preparative examples 1 through 6 and 10.
Figure 19:
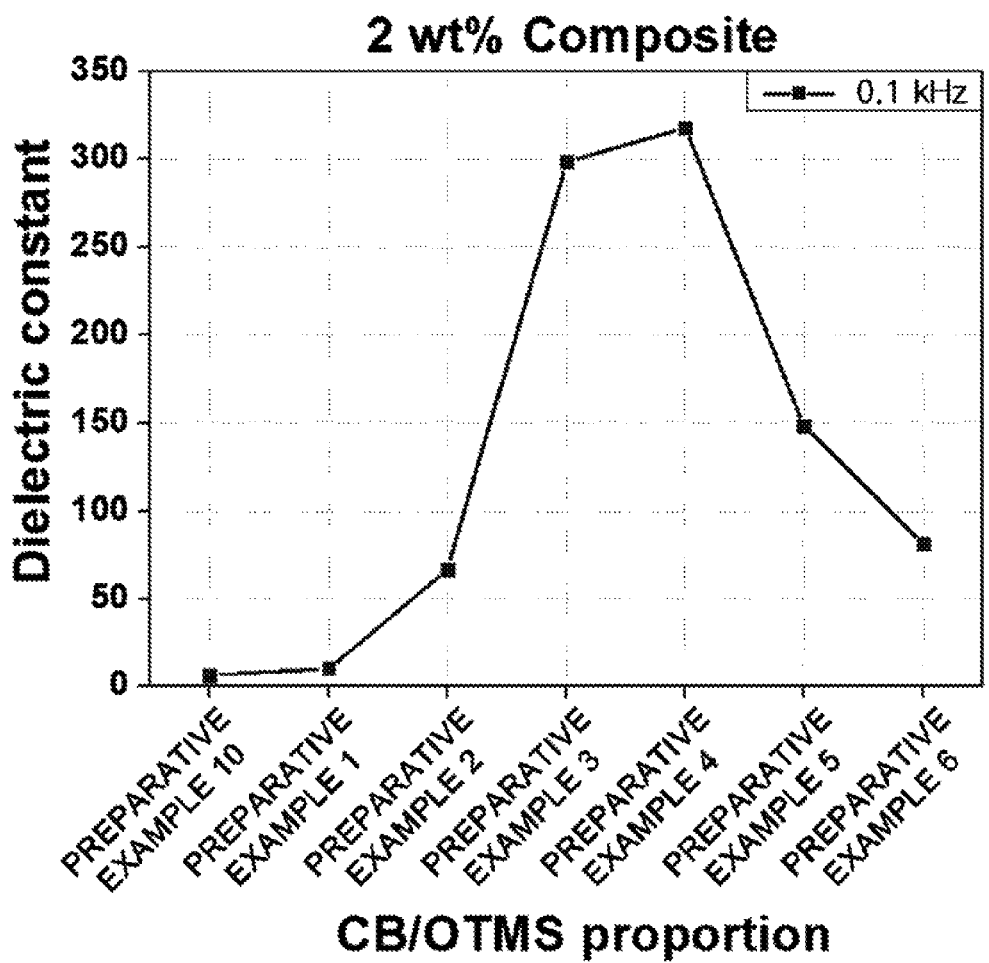
FIG. 19 is a graph showing changes in dielectric constant at the frequency of 0.1 kHz in preparative examples 1 through 6 and 10.
Figure 20:
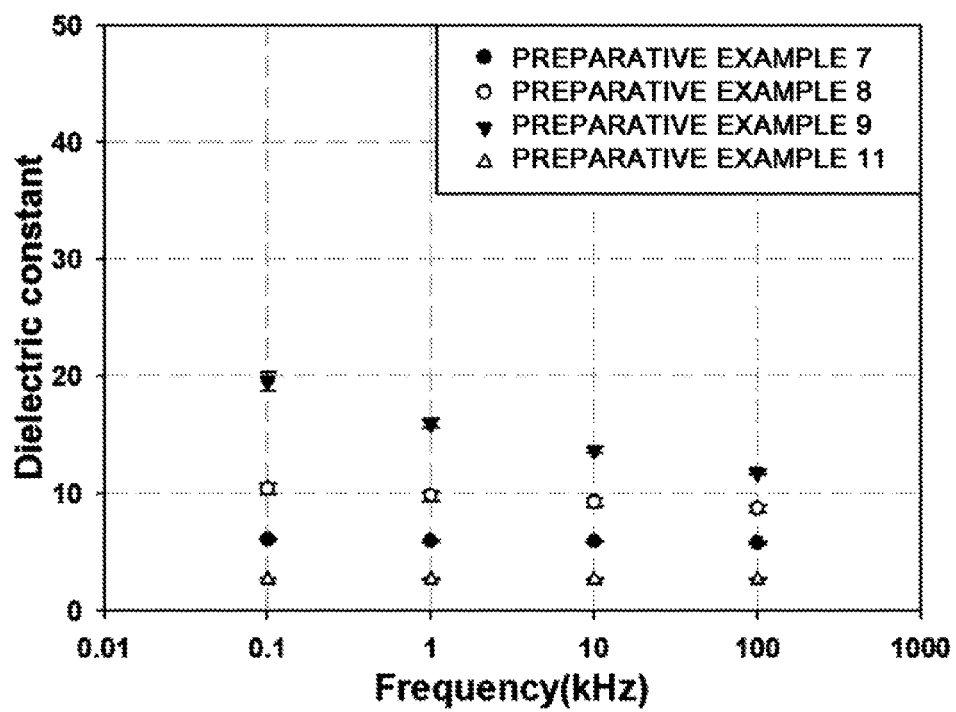
FIG. 20 is a graph showing dielectric constant vs frequency in preparative examples 7 through 9 and 11.
Figure 21:
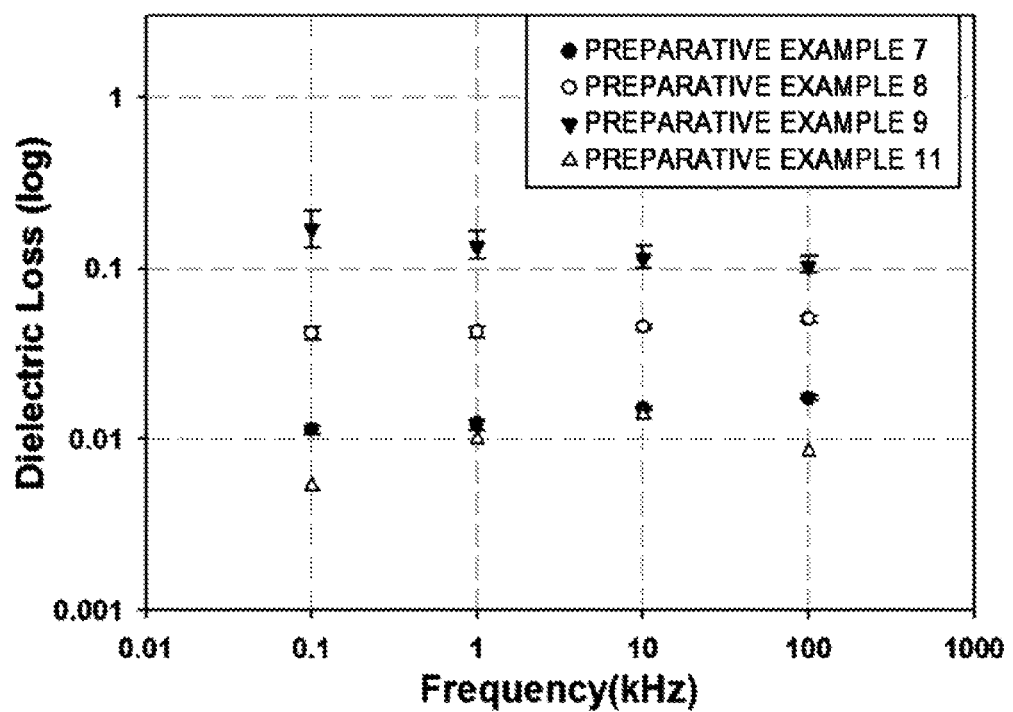
FIG. 21 is a graph showing dielectric loss (log) vs frequency in preparative examples 7 through 9 and 11.

Also, as shown in FIG. 17, a fifth method assembles the upper body 520 of the force sensor with the lower body 510 of the force sensor with a double-sided tape, a thermal adhesive tape, or a polymer adhesive stacked between.

The present disclosure will be hereinafter described in further detail through example, and the scope and content of the present disclosure should be interpreted without reduction or restriction to the following example. Also, it will be apparent that those skilled in the art can easily practice the invention based on the present disclosure including the following example even though experiment results are not specifically presented, and it is obvious that such modifications and adaptations fall in the appended claims.

Further, experiment results presented hereinafter are just representative experiment results of the above example and comparative example, and each effect of many embodiments of the present disclosure that is not explicitly presented below is specifically described in corresponding parts.

PREPARATIVE EXAMPLE 1

2 g matrix of transparent two-component liquid type thermoset polydimethylsiloxane (PDMS) resin consisting of a matrix and a hardener at a ratio of 10:1 was introduced in 0.044 g carbon black (Black pearl 2000, Cabot) filler dispersed in a solution which 0.22 g octadecyltrimethoxysilane (OTMS) is dissolved in chloroform, and stirred and dried in a vacuum oven of −1 MPa and 25° C. to remove a solvent, thereby to prepare a polymer dielectric composition.

The dispersion of carbon black (CB) was performed using an ultrasonic device, mixing of the carbon black and the PDMS matrix was performed using a high viscosity mixing and defoaming device, and the stirring and defoaming processes were performed at the same time.

PREPARATIVE EXAMPLES 2-6

The same method as example 1 was performed, using each of 0.264 g, 0.308 g, 0.352 g, 0.396 g, and 0.44 g octadecyltrimethoxysilane in place of 0.22 g.

PREPARATIVE EXAMPLE 7

0.011 g multi-walled carbon nanotubes (MWNTs) treated with dodecylamine was introduced and dispersed in chloroform, and 2 g polydimethylsiloxane (PDMS) resin was introduced, stirred and dried in a vacuum oven of −1 MPa and 25° C. to remove a solvent, thereby to prepare a polymer dielectric composition.

The dispersion was performed using an ultrasonic device, mixing of the multi-walled carbon nanotubes and the PDMS matrix was performed using a high viscosity mixing and defoaming device, and the stirring and defoaming processes were performed at the same time.

PREPARATIVE EXAMPLES 8-9

The same method as example 7 was performed, using each of 0.0165 g and 0.022 g multi-walled carbon nanotubes treated with dodecylamine in place of 0.011 g.

PREPARATIVE EXAMPLE 10

0.044 g carbon black filler and 2 g polydimethylsiloxane (PDMS) resin dispersed in chloroform were introduced, stirred and dried in a vacuum oven of −1 MPa and 25° C. to remove a solvent, thereby to prepare a polymer dielectric composition.

PREPARATIVE EXAMPLE 11

2 g polydimethylsiloxane (PDMS) resin was introduced in chloroform, stirred and dried in a vacuum oven of −1 MPa and 25° C. to remove a solvent, thereby to prepare a polymer dielectric composition.

TEST EXAMPLE 1

To measure the dielectric constant and the dielectric loss of the polymer dielectric compositions of preparative examples 1 through 6 and 7 through 11, after an electrode was made using the polymer dielectric composition, the dielectric constant and the dielectric loss was measured using an impedance analyzer (Agilent 4263B), and the results are shown in the following Table 1 and FIGS. 18 through 21.

A method for making the electrode is as follows.

First, 0.2 g hardener of PDMS was introduced in the polymer dielectric composition and mixed to form a film having a thickness of from 200 to 300 μm on a 100 μm copper substrate using a doctor blade method, and to remove the pores of the film and a solvent, the film was kept in a vacuum oven of −1 MPa and the temperature of 25° C. for about 30 minutes, and undergone a process of curing at the temperature of 120° C. for 1 hour to prepare a film. Subsequently, gold was coated on the upper surface of the prepared film using a sputtering method to make an electrode.

TABLE 1

| Classification | Frequency (kHz) | | | |
| --- | --- | --- | --- | --- |
| | 0.1 | 1 | 10 | 100 |
| Preparative example 1 | 9.79 | 8.54 | 8.21 | 7.97 |
| Preparative example 2 | 66.59 | 49.09 | 36.31 | 24.96 |
| Preparative example 3 | 298.35 | 146.77 | 149.32 | 79.35 |
| Preparative example 4 | 317.80 | 271.07 | 163.52 | 81.42 |
| Preparative example 5 | 147.98 | 134.13 | 115.84 | 97.19 |
| Preparative example 6 | 81.39 | 74.55 | 62.74 | 52.55 |
| Preparative example 7 | 6.68 | 6.59 | 6.34 | 6.05 |
| Preparative example 8 | 10.81 | 9.95 | 9.35 | 9.01 |
| Preparative example 9 | 19.85 | 16.54 | 13.56 | 12.95 |
| Preparative example 10 | 6.12 | 6.02 | 5.97 | 5.84 |
| Preparative example 11 | 2.81 | 2.80 | 2.85 | 2.82 |

As can be seen from Table 1 and FIGS. 18 through 21, preparative examples 1 through 9 using the conductive filler including the dispersant had a significant increase in dielectric constant and much improved dielectric properties, as compared to preparative examples 10 through 11.

EXAMPLE 1

Figure 11:
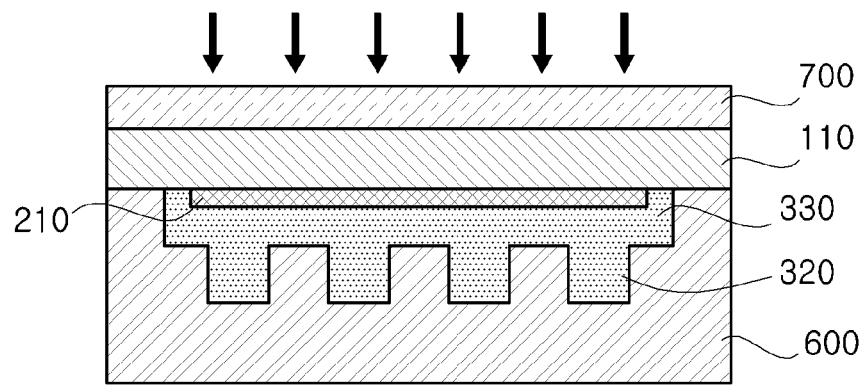
FIG. 11 is a cross-sectional view showing a process of preparing an upper body of a force sensor according to an embodiment of the present disclosure and the upper body of the force sensor.
Figure 12:
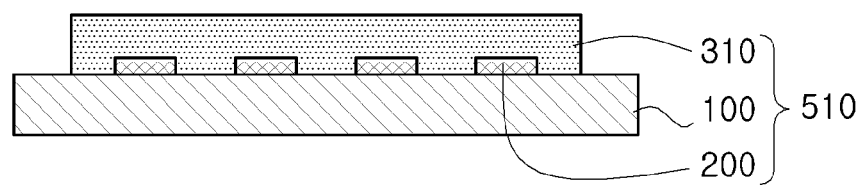
FIG. 12 is a cross-sectional view showing a lower body of a force sensor according to an embodiment of the present disclosure.

The polymer dielectric composition prepared through preparative example 7 was coated on the mold 600 shown in FIG. 7, a vacuum was applied to remove all air bubbles inside, thereby to prepare the first dielectric 330 and the pressure rib 320, and as shown in FIG. 11, the polyimide film 110 having the Au electrodes 210 was attached to the upper surface of the first dielectric 330, and cured in a thermal oven of the temperature of 110° C. for 90 minutes by the application of a uniform distributed load of 3 kg to prepare the upper body 520 of the force sensor.

The Au electrodes 200 were disposed on the polyimide film 100 at a predetermined interval, the polymer dielectric composition of example 1 was coated, and squeezing and leveling was performed for 30 minutes to form the lower body 510 of the force sensor.

Figure 14:
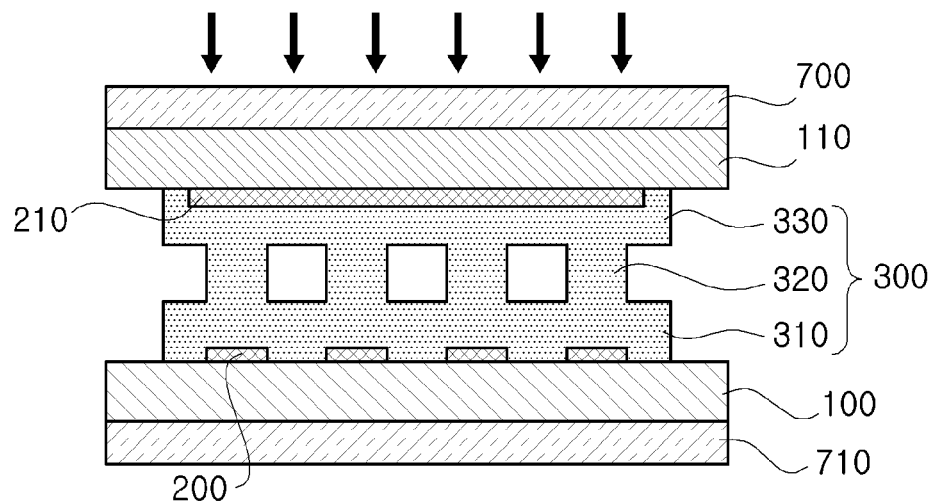
FIG. 14 is a cross-sectional view showing a process of preparing a force sensor with an upper body of the force sensor and a lower body of the force sensor assembled according to another embodiment of the present disclosure and the force sensor.

The lower body 510 of the force sensor and the upper body 520 of the force sensor were disposed such that a part of the end of the pressure rib 320 of the upper body 520 of the force sensor is embedded in the second dielectric 310, followed by assembly, and as shown in FIG. 14, flat plates 700 and 710 were stacked on the upper surface and the lower surface of the force sensor and cured at the temperature of 110° C. for 90 minutes by the application of self-weight of 0.2 kg to prepare a force sensor as in FIG. 13.

EXAMPLE 2

The upper body 520 of the force sensor was prepared by the same method as example 1.

The Au electrodes 200 were disposed on the polyimide film 100 at a predetermined interval, and the polymer dielectric composition of preparative example 1 was coated and cured at the temperature of 110° C. for 90 minutes to form the lower body 510 of the force sensor.

As shown in FIG. 15, after attaching the adhesive tape 800, 810 to the edges at both ends of the polyimide film 100, the pressure rib 320 of the upper body 520 of the force sensor was disposed facing the Au electrodes 200, flat plates were stacked on the upper and lower surfaces of the force sensor, and a uniform distributed load of 20N was applied at room temperature for 30 minutes to prepare a force sensor.

EXAMPLE 3

The upper body 520 of the force sensor was prepared by the same method as example 1.

The lower body 510 of the force sensor was prepared by the same method as example 2.

As shown in FIG. 16, after performing plasma etching on the lower surface of the upper body 520 of the force sensor and the upper surface of the lower body 510 of the force sensor for 30 minutes, the pressure rib 320 of the upper body 520 of the force sensor was disposed facing the Au electrodes 200, flat plates were stacked on the upper and lower surfaces of the force sensor, and a uniform distributed load of 2 kg was applied at room temperature for 5 minutes to prepare a force sensor.

EXAMPLE 4

The polymer dielectric composition prepared through preparative example 7 was coated on the first mold 610 of the composite mold as shown in FIG. 8A, a vacuum was applied to remove all air bubbles inside thereby to prepare the first dielectric 330, and as shown in FIG. 9, the second mold 612 was loaded on the first dielectric 330, the polymer dielectric composition was re-coated to prepare the pressure rib 320, then the second mold 612 was removed using the detaching jig 620, and curing was performed to prepare the upper body 520 of the force sensor.

The lower body 510 of the force sensor was prepared by the same method as example 1.

EXAMPLE 5

The polymer dielectric composition prepared through preparative example 7 was coated on the first mold 611 of the composite mold as shown in FIG. 8B, a vacuum was applied to remove all air bubbles inside thereby to prepare the first dielectric 330 and the second pressure rib 322, and as shown in FIG. 10, the second mold 612 was loaded on the first dielectric 330, the polymer dielectric composition was re-coated to prepare the first pressure rib 321, then the second mold 612 was removed using the detaching jig 620, and curing was performed to prepare the upper body 520 of the force sensor.

The lower body 510 of the force sensor was prepared in the same method as example 1.

DETAILED DESCRIPTION OF MAIN ELEMENTS

100: First substrate
110: Second substrate
200: First electrode
210: Second electrode
300: Dielectric
310: Second dielectric
320: Pressure rib
321: First pressure rib
322: Second pressure rib 330: First dielectric
400: Adhesive tape
500: Force sensor
510: Lower body of force sensor
520: Upper body of force sensor
600: Integral mold
610, 611: First mold
612: Second mold
620: Detaching jig
700, 710: Flat plate
800, 810, 820: Adhesive tape

The invention claimed is:

1. A method for forming a force sensor, comprising:
   a) stacking a first electrode on a first substrate;
   b) stacking a second electrode on a second substrate;
   c) forming a first dielectric and a pressure rib on the second electrode to prepare an upper body of the force sensor;
   d) forming a second dielectric on an upper surface of the first electrode to prepare a lower body of the force sensor; and
   e) bonding the upper body of the force sensor and the lower body of the force sensor, wherein the first dielectric, the pressure rib, and the second dielectric include a polymer dielectric composition comprising polymeric elastomer, and the polymeric elastomer is at least one selected from silicone-based resin, urethane-based resin, isoprene-based resin, fluoro-based resin, styrene-butadiene rubber, chloroprene rubber, acrylonitrile copolymer, and acrylate rubber, and wherein the polymer dielectric composition comprises a conductive filler a ceramic filler, an organic metal compound, or their mixtures,
   wherein in the polymeric elastomer, the conductive filler is at least one selected from metal particles, single-walled carbon nanotubes, multi-walled carbon nanotubes, graphene, graphite, carbon black, carbon fibers, and fullerene,
   wherein the ceramic filler is metal oxide, silicate, boride, carbide, nitride, perovskite, or their mixtures, and
   wherein the organic metal compound is a compound in which at least one type of metal selected from copper, zinc, and nickel is bonded to at least one type of organic matter selected from phthalocyanine, uranine, and rhodamine.

2. The method for preparing a force sensor according to claim 1, wherein the first dielectric and the pressure rib are formed using an integral mold or a composite mold made up of multiple separate parts.

3. The method for preparing a force sensor according to claim 2, wherein the pressure rib is formed using the mold after the first dielectric is prepared.

4. The method for preparing a force sensor according to claim 2, wherein the mold is fixed using an adhesive tape.

5. The method for preparing a force sensor according to claim 1, wherein the pressure rib is formed as a first pressure rib, a second pressure rib, or a plurality of pressure ribs.

6. The method for preparing a force sensor according to claim 2, wherein a coating thickness of the pressure rib is thicker than a thickness of the surface of the mold by 5 to 100 μm.

7. The method for preparing a force sensor according to claim 2, wherein a detaching jig is used to separate the first dielectric or the pressure rib from the mold.

8. The method for preparing a force sensor according to claim 1, wherein the step e) is performed by any one method selected from:

a first method which bonds the upper body of the force sensor and the lower body of the force sensor with a thermal adhesive tape or a double-sided tape on both edges of the first substrate and the second substrate;
   a second method which assembles the upper body of the force sensor with the lower body of the force sensor by performing plasma etching on a lower surface of the upper body of the force sensor and an upper surface of the lower body of the force sensor;
   a third method which disposes the lower body of the force sensor and the upper body of the force sensor such that a part of an end of the pressure rib of the upper body of the force sensor is embedded in a lower body of the second dielectric, and assembles and cures them;
   a fourth method which forms a pressure rib for adhesion having a cross sectional area 1.1 to 10 times wider than a cross sectional area of the pressure rib of the upper body of the force sensor on an upper surface of the lower body of the force sensor, and assembles the upper body of the force sensor with the lower body of the force sensor; and
   a fifth method which assembles the upper body of the force sensor with the lower body of the force sensor with a double-sided tape, a thermal adhesive tape, or a polymer adhesive stacked between the upper body of the force sensor and the lower body of the force sensor.

9. The method for preparing a force sensor according to claim 1, wherein the first substrate and the second substrate are a polyimide film, a polyethylene terephthalate film, or at least one selected from silicone-based, polystyrene-based, polyamide-based, polyurethane-based, polyepoxy-based, polyacryl-based, polyester-based and polyolefin-based polymeric elastomers, or their mixtures.

10. The method for preparing a force sensor according to claim 1, wherein the first electrode and the second electrode are at least one selected from gold, silver, copper, poly(3,4-ethylenedioxythiophene) polystyrene sulfonate, graphene, a metal nanowire, and elastomer containing a conductive filler.

11. The method for preparing a force sensor according to claim 1, wherein the metal oxide is at least one selected from zirconium oxide, tantalum oxide, tin oxide, niobium oxide, titanium oxide, rare earth oxide, antimony oxide, vanadium oxide, iron oxide, strontium oxide, copper oxide, titanium oxide, zinc oxide, niobium oxide, tantalum oxide, yttrium oxide, $CaTiO_3$, $MgZrSrTiO_6$, $MgTO_3$, $MgAl_2O_4$, $BaZrO_3$, $BaTiO_3$, $BaSnO_3$, $BaNb_2O_6$, $BaTa_2O_6$, $BaSrTiO_3$, $WO_3$, $MnO_2$, $SrZrO_3$, $TiO_2$, $ZnO$, $SnTiO_4$, $ZrTiO_4$, $CaZrO_3$, $CaSnO_3$, $CaWO_4$, $MgTa_2O_6$, $MrZrO_3$, $La_2O_3$, $CaZrO_3$, $MgSnO_3$, $MgNb_2O_6$, $SrNb_2O_6$, $MgTa_2O_6$, and $Ta_2O_3$, and
the silicate is at least one selected from $Na_2SiO_3$, $Li_4SiO_4$, $BaTiSi_3O_9$, $ZrSiO_4$, $CaMgSi_2O_6$, and $Zn_2SiO_4$.

12. The method for preparing a force sensor according to claim 1, wherein the conductive filler, the ceramic filler, or the organic metal compound further comprises a dispersant of the following Formula 1:

$$CX_3(CX_2)n\text{-}Y \qquad [\text{Formula 1}]$$

where X is H or F,
Y is H, SH, $NH_2$, OH, COOH, or $SiR_1R_2R_3$,
n is an integer of from 1 to 30, and
the $R_1$, $R_2$ and $R_3$ are the same or different, and are H, F, Cl, Br, an alkyl group with 1 to 10 carbon atoms, an alkoxy group with 1 to 10 carbon atoms, an alkenyl group with 1 to 10 carbon atoms, an alkyne group with 1 to 10 carbon atoms, an aryl group with 1 to 30 carbon atoms, a cyclo alkyl group with 1 to 30 carbon atoms, or a cyclo alkenyl group with 1 to 30 carbon atoms.

* * * * *